US008549243B2

(12) United States Patent
Coronado et al.

(10) Patent No.: US 8,549,243 B2
(45) Date of Patent: Oct. 1, 2013

(54) REGENERATION OF DELETED DATA

(75) Inventors: Juan Alonso Coronado, Tucson, AZ (US); Beth Ann Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 13/019,746

(22) Filed: Feb. 2, 2011

(65) Prior Publication Data
US 2012/0198188 A1  Aug. 2, 2012

(51) Int. Cl.
*G06F 12/16* (2006.01)

(52) U.S. Cl.
USPC .................... 711/162; 711/E12.103

(58) Field of Classification Search
None
See application file for complete search history.

(56) References Cited

U.S. PATENT DOCUMENTS

| | | | |
|---|---|---|---|
| 6,449,624 B1 | 9/2002 | Hammack et al. | 707/203 |
| 6,847,982 B2 | 1/2005 | Parker et al. | 707/200 |
| 7,363,326 B2 | 4/2008 | Margolus | 707/201 |
| 2006/0026220 A1 | 2/2006 | Margolus | 707/204 |
| 2007/0271422 A1 | 11/2007 | Osaki | 711/154 |
| 2008/0059894 A1 | 3/2008 | Cisler et al. | 715/762 |
| 2008/0162817 A1 | 7/2008 | Batterywala | 711/118 |
| 2009/0248757 A1 | 10/2009 | Havewala et al. | 707/203 |
| 2009/0292839 A1 | 11/2009 | Oh | 710/55 |
| 2010/0088334 A1 | 4/2010 | Wasserman et al. | 707/769 |
| 2010/0169595 A1 | 7/2010 | Bryant-Rich | 711/162 |
| 2010/0179959 A1 | 7/2010 | Shoens | 707/758 |

*Primary Examiner* — Kevin Verbrugge
(74) *Attorney, Agent, or Firm* — John H. Holcombe

(57) ABSTRACT

To prevent loss of a data volume by unintended deletion, including various versions of the data volume, the data is preserved, and, when needed, is regenerated at a different volume address than that of the deleted volume. In a computer-implemented data storage system, a method responds to a received command to delete a volume of data identified by a volume address, preserving data of the volume prior to deletion, and generates a unique token associated with the volume and version of the volume as of the deletion. The unique token is communicated as associated with the received delete command. The method responds to a received command to regenerate the data of the deleted volume, generating a command to find the data identified by the unique token, and creating a new, different, volume address for the data of the preserved deleted volume, thereby keeping both volume versions.

20 Claims, 5 Drawing Sheets

| Byte | Description | | |
|---|---|---|---|
| 0 | Order x'XX' (Regenerate Deleted Volume) | | |
| 1 | Flags | | |
| | *Bits* | *Definition* | |
| | 0 | Use existing volume data and metadata | |
| | 1 | Migrate to specified pool | |
| | 2 | Use Preserved Data associated with Token | |
| 2-3 | Volume ID (LCU and volume number) | | |
| 4-5 | Extent Pool ID when byte 1, bit 1 is set. | | |
| 6-11 | Unique Token | | |
| 12-15 | Additional Parameters.  Reserved for future growth. | | |

FIG. 5

REGENERATION OF DELETED DATA

DOCUMENT INCORPORATED BY REFERENCE

Commonly assigned, copending, U.S. patent application Ser. No. 12/908,284, filed Oct. 20, 2010, is incorporated for its showing relating to preservation of deleted data.

FIELD OF THE INVENTION

This invention relates to data storage systems, and more particularly to the handling of data that is deleted.

BACKGROUND OF THE INVENTION

Data storage systems store data at the request of user. For example, storage controllers control access to data storage media and memories in response to read and write requests. The storage controllers may direct the data in accordance with data storage devices such as RAID (redundant array of independent disks), JBOD (just a bunch of disks), and storage with other redundancy and security levels.

As an example, an IBM® ESS (Enterprise Storage Server) such as a DS8000 has redundant clusters of computer entities, cache, non-volatile storage, etc., called "central electronics complexes" or "CECs". The CECs may be partitioned into actual or virtual "storage pools" or field images running within the system, where each partition is also redundant, including partitions within each of the CECs.

Data storage systems additionally offer the user the capability to delete the data. As an example, where the data is stored in the form of volumes, the deletion of one or more volumes may be done with Command Line Interface (CLI) commands or with Graphical User Interface (GUI) commands.

To prevent the inadvertent deletion of a volume, storage controllers use an overall control switch and parameters or modifiers, as discussed in the copending application Ser. No. 12/908,284, to control the behavior of the volume delete. For example, when the overall control switch is set to "ON" value, the user must specify an override parameter in the CLI command to delete a volume. Without the override parameter, the storage controller rejects the volume delete request if the volume meets certain criteria such as: the volume is on-line to a host, or the volume is in a Copy Service (CS) relationship. If the overall control switch is set to "FALSE" value, the volume can be deleted without additional CLI parameters or modifiers. In another case, even though the overall control switch is set to "ON", it is possible for the user to remove a volume from its (CS) relationship or to remove it from its volume group such that it is no longer on-line to a host. This is possible when the data is constantly being revised, and an old version of a volume is thereby replaced by a new version, and the previous version is allowed to be deleted.

The deleted version(s) may comprise important information that was (perhaps accidentally) not carried forward to the current version, conceivably leading to failure for applications running to the volume as well as the data loss or loss of integrity associated with the removal of the volume.

SUMMARY OF THE INVENTION

Methods, data storage systems, and computer program products are provided for regenerating deleted data volumes, including various versions of the data volume, and regenerating the data at a different volume address than that of the deleted volume.

In one embodiment, in a computer-implemented data storage system, a method comprises responding to a received command to delete a volume of data identified by a volume address, preserving data of the volume prior to deletion, and generating a unique token associated with the volume and version of the volume as of the deletion;

communicating the unique token as associated with the received delete command; and responding to a received command to regenerate the data of the deleted volume, generating a command to find the data identified by the unique token, and creating a new volume address for the data of the preserved deleted volume, the new volume address different from the volume address of the deleted volume.

In a further embodiment, the unique token is also stored with metadata associated with the preserved deleted volume, and the command to find the data is implemented in the storage system to search metadata for the unique token.

In another embodiment, the method additionally comprising the steps of migrating the preserved data to a volume having the new volume address, and communicating the new address as associated with the received regenerate command.

In a further embodiment, the storage system comprises at least two storage pools, and the new volume address is in a different the storage pool from the deleted volume address.

In a still further embodiment, the generated command comprises at least one flag to indicate whether to place the new volume address in the different storage pool.

In further embodiment, the metadata comprises the identification of the storage pool of the deleted volume address.

In another embodiment, the generated command is generated by a storage controller of the computer-implemented data storage system.

For a fuller understanding of the present invention, reference should be made to the following detailed description taken in conjunction with the accompanying drawings.

BRIEF DESCRIPTION OF THE DRAWINGS

FIG. 5 is an illustration of a command generated in the process of FIG. 4.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
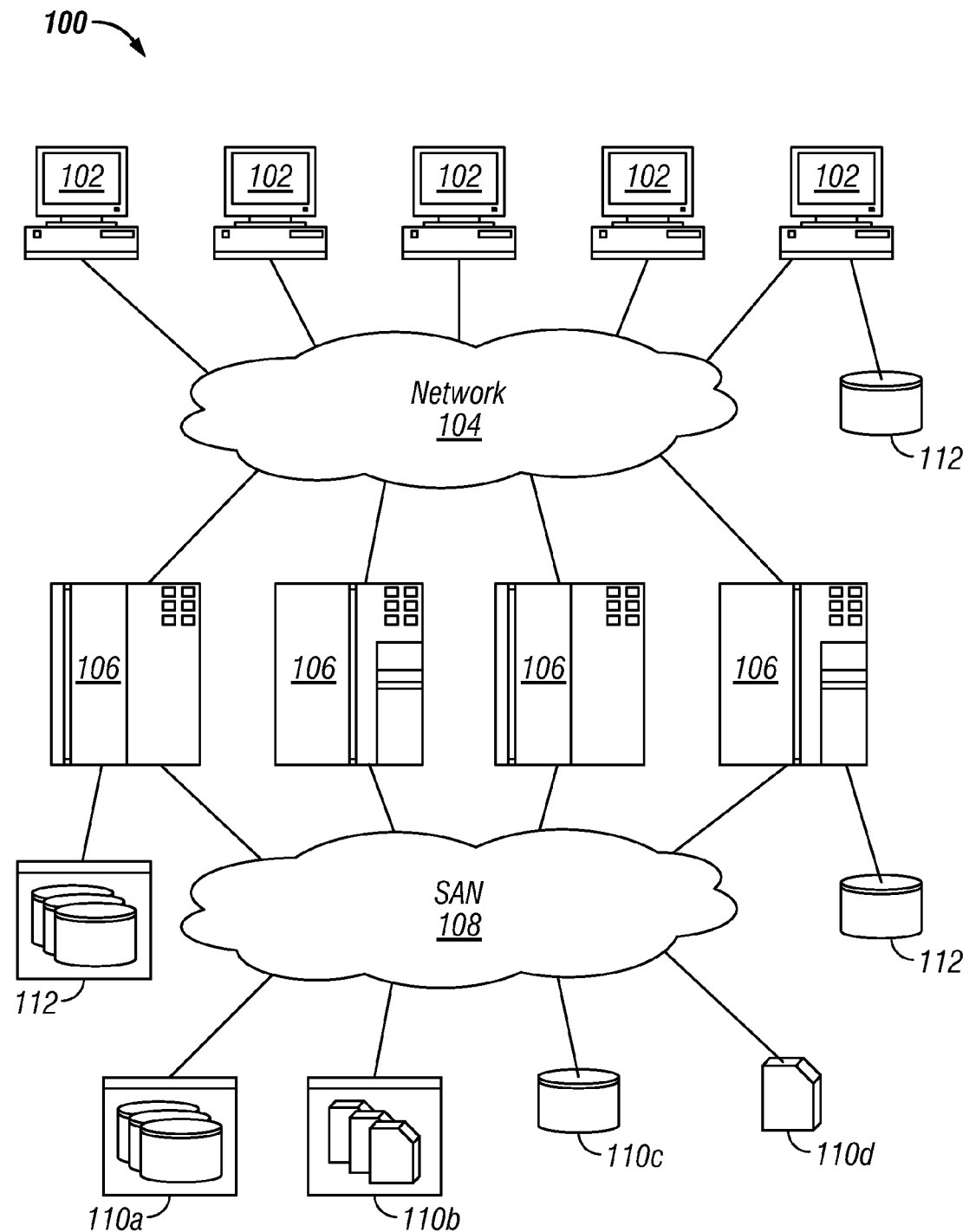
FIG. 1 is a high-level block diagram showing one example of a computer-implemented system in a network environment made up of different types of computing devices.

Referring to FIG. 1, an example of a computer-implemented system 100 is illustrated. The system is one of many computer-implemented systems which may implement the present invention to preserve and regenerate deleted data. The system architecture 100 is presented to show various types of computing devices that may benefit from the apparatus and methods disclosed herein. The system architecture 100 is presented only by way of example and is not intended to be limiting. Indeed, the apparatus and methods disclosed herein may be applicable to a wide variety of different computing devices and is not limited to those illustrated herein.

As shown, the exemplary system architecture 100 includes one or more computer processors 102, 106 interconnected by a network 104. The network 104 may include, for example, a local-area-network (LAN), a wide-area-network (WAN), the Internet, an intranet, or the like. In certain embodiments, the computer processors 102, 106 may include both client computer processors 102 and server computer processors 106. In the example, the client computers 102 initiate communication sessions, whereas the server computer processors 106 wait for requests from the client computer processors 102. In certain embodiments, the computer processors 102 and/or server processors 106 may connect to one or more internal or external direct-attached storage systems 112 (e.g., hard-disk drives, solid-state drives, tape drives, libraries, etc.). These computer processors 102, 106 and direct-attached storage systems 112 may communicate using protocols such as ATA, SATA, SCSI, SAS, Fibre Channel, or the like.

The system architecture 100 may, in certain embodiments, include a storage network 108 behind the server processors 106, such as a storage-area-network (SAN) or a LAN (e.g., when using network-attached storage). This network 108 may connect the server processors 106 to one or more storage systems 110, such as arrays 110a of hard-disk drives or solid-state drives, tape libraries 110b, individual hard-disk drives or solid-state drives 110c, tape drives or libraries 110d, CD-ROM libraries, virtual tape libraries, or the like. To access a storage system 110, a server processor 106 may communicate over physical connections from one or more ports on the server processor 106 to one or more ports on the storage system 110. A connection may be through a switch, fabric, direct connection, or the like. In certain embodiments, the server processors 106 and storage systems 110 may communicate using a networking standard such as Fibre Channel (FC).

Figure 2:
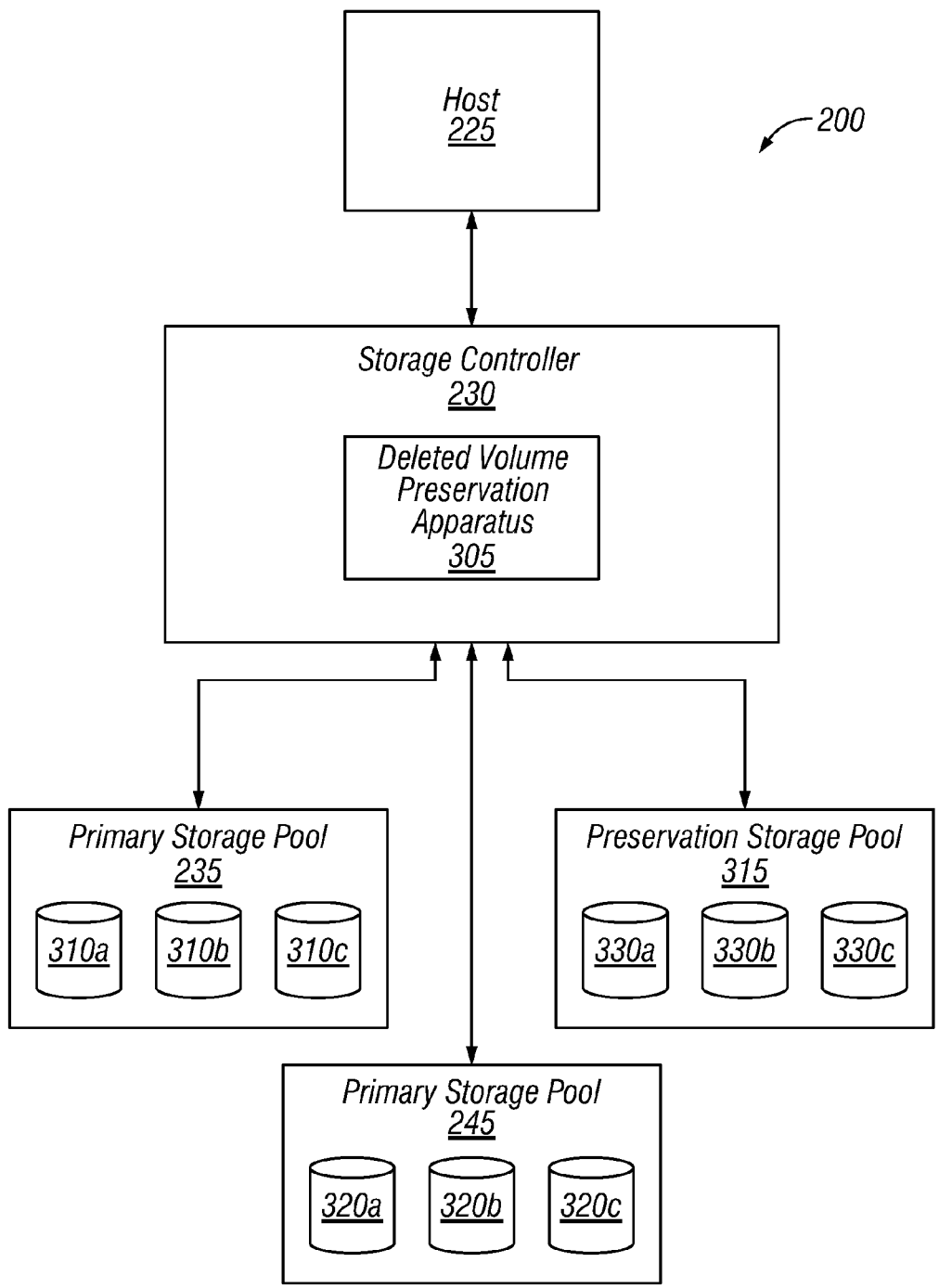
FIG. 2 is a high-level block diagram showing one embodiment of a computer-implemented system for preserving and regenerating deleted data of the computer-implemented system of FIG. 1.

Referring to FIG. 2, one embodiment of a computer-implemented system 200 for storing data of the system 100 of FIG. 1 and preserving and regenerating deleted data is illustrated. The computer-implemented system 200 may be implemented in any of the devices or systems of FIG. 1, including a host system 225 in communication with a storage controller 230. The storage controller 230 communicates with a plurality of primary storage pools 235 and 245 and a preservation storage pool 315. The primary storage pool 235 and 245 and the preservation storage pool 315 each comprise storage devices 310, 320, 330. The storage controller 230 comprises apparatus 305 for preserving and regenerating deleted data. Those of skill in the art recognize that the system 200 may be simpler or more complex than illustrated. The host 225 may be substantially similar to one or more of the server processors 106 or the client computer processors 102, and that the storage controller 230 and storage pools 235, 245 and 315 may be substantially similar to one or more of the storage systems 110, 112 of FIG. 1. Furthermore, each of the storage devices 310, 320, 330 may comprise data storage devices such as RAID (redundant array of independent disks), JBOD (just a bunch of disks), etc. Examples of devices include hard disk drives, solid-state drives, optical storage drives, holographic drives, etc., or combinations of devices and systems.

As discussed in the '284 application, the devices and systems of the storage pools may have disparate, different and/or varying operational characteristics. For example, the primary storage pools 235 and 245 may have higher speed operational characteristics than the preservation storage pool 315, whereas the preservation storage pool 315 may be of lower cost per storage unit and have greater storage capacities than the primary storage pools 235 and 245. Alternatively, a plurality of storage pools may comprise the same devices and comprise different partitions within those devices.

As mentioned above, an IBM® ESS (Enterprise Storage Server) such as a DS8000 has redundant clusters of computer entities, cache, non-volatile storage, etc., called "central electronics complexes" or "CECs". The CECs may be partitioned into actual or virtual "storage pools" or field images running within the system, where each partition is also redundant, including partitions within each of the CECs.

Data storage systems offer the user the capability to delete the data. As an example, where the data is stored in the form of volumes, the deletion of one or more volumes may be done with Command Line Interface (CLI) commands or with Graphical User Interface (GUI) commands.

To prevent the inadvertent deletion of a volume, storage controllers use an overall control switch and parameters or modifiers, as discussed in the copending application Ser. No. 12/908,284, to control the behavior of the volume delete. For example, when the overall control switch is set to "ON" value, the user must specify an override parameter in the CLI command to delete a volume. Without the override parameter, the storage controller rejects the volume delete request if the volume meets certain criteria such as: the volume is on-line to a host, or the volume is in a Copy Service (CS) relationship. If the overall control switch is set to "FALSE" value, the volume can be deleted without additional CLI parameters or modifiers. In another case, even though the overall control switch is set to "ON", it is possible for the user to remove a volume from its (CS) relationship or to remove it from its volume group such that it is no longer on-line to a host. This is possible when the data is constantly being revised, and an old version of a volume is thereby replaced by a new version, and the previous version is allowed to be deleted.

The deleted version(s) may comprise important information that was (perhaps accidentally) not carried forward to the current version, conceivably leading to failure for applications running to the volume as well as the data loss or loss of integrity associated with the removal of the volume.

A "data volume" (referring to logical volume in one embodiment) comprises a unit of data that may be fixed or variable in the amount of data and accompanying information, and is supported by "metadata" which is information about the data volume. The metadata may accompany and be stored with the data volume or may be stored separately from the data volume. In certain embodiments, multiple logical volumes may be used, such as a logical volume group, multiple logical volume groups, or any other suitable unit of data may be used.

Still referring to FIG. 2, the apparatus 305 for preserving and regenerating deleted data may reside on the storage controller 230 as depicted. A user may interface with the apparatus 305 through a CLI, a GUI, and/or application of the host 225 and/or other computing device in communication with the storage controller 230. While the depicted embodiment shows the apparatus 305 residing on the storage controller 230, all or portions of the apparatus 305, in other embodiments, may reside on the host 225 or a client computer 102 of FIG. 1, storage devices 310, 320, 330 and/or other device in communication with the storage pools 235, 245 and 315.

Figure 3:
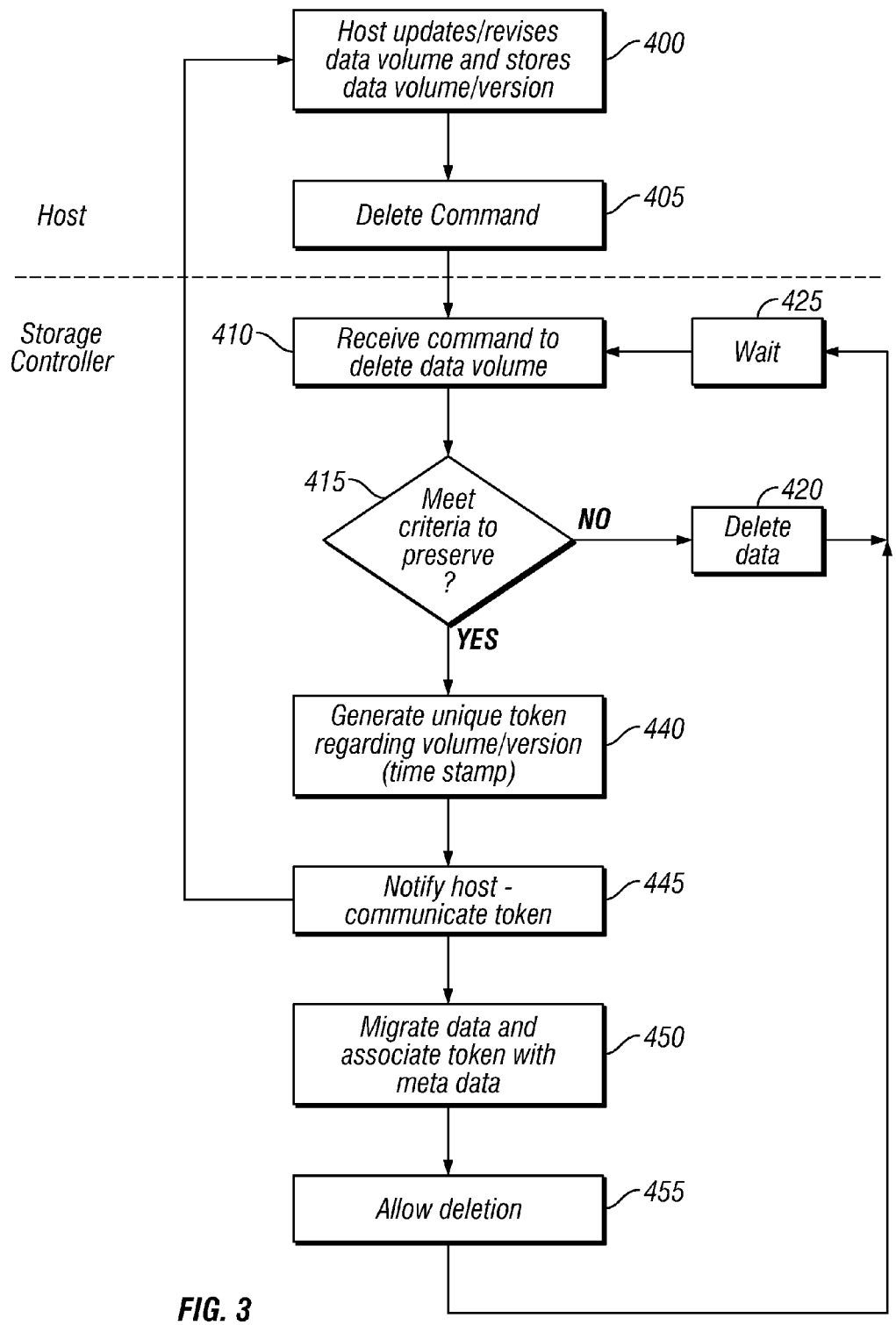
FIG. 3 is a flow diagram showing one embodiment of a method for preserving deleted data for regeneration of the computer-implemented system of FIG. 2.

Referring to FIGS. 2 and 3, an embodiment of a process for preserving deleted data is illustrated. Some of the process is based on the showing of the copending application Ser. No. 12/908,284. In step 400, the host 225 updates and revises one or more data volumes and stores the data internally and/or commands the storage controller 230 to store the data. The storage controller 230 stores the data in one or more of the primary storage pools 235, 245. Step 405 comprises a Delete command to delete one or more of the data volumes. The Delete command may be provided by way of a CLI or GUI on a computer in communication with the storage controller 230, such as host 225, and/or by an application of the host 225.

The storage controller 230 receives the command to delete the data volume(s) in step 410, consults the criteria discussed in the copending application Ser. No. 12/908,284 and, in step 415, determines whether the criteria to preserve the data volume(s) has been met. If not, the storage controller deletes the data in step 420. The deletion may not be immediate, but may be indicated at the metadata for the volume(s) and/or one or more catalogs or listings that the data is deleted, such that the data is eventually overwritten. In step 425, the process waits for the next delete command of step 410. Ultimately, the data is overwritten and becomes irretrievable and is lost.

If the criteria discussed in the copending application Ser. No. 12/908,284 is met in step 415, the storage controller 230 invokes the process to preserve the data of the data volume prior to deleting the data volume. In one embodiment, the data of the data volume will be preserved by migrating, moving and/or copying the data volume to an additional location, such as preservation storage pool 315, and will store the metadata associated with the data volume. The storage of the data volume may be dictated by deletion parameters associated with the data volume, or may be in accordance with deletion parameters provided by the host 225, provided by the storage controller 230, or provided by another source. The deletion parameters, in one embodiment, are stored as metadata with the data volume. In another embodiment, the deletion parameters may be provided with the command to delete the data. As an example, the deletion parameters specify where to migrate the data volume prior to deletion, the data preservation retention time, the data preservation priority, and data preservation limitations such as available storage space or the existence to higher priority volumes which could overwrite lower priority data when storage availability is at a threshold.

The data volume is subject to revision, such that an old version of a volume is replaced by a new version. The various versions may have the same data volume identification, and the previous version is therefore deleted. In one embodiment, the deletion parameters specify that the data volume is to be tracked to allow one or more of the various versions of the data volume to be recovered. For example, in an environment that shares storage resources, such as a network or cloud computing, when a user or application no longer needs its data, the volume can be deleted while preserving a copy for subsequent processing. When the user returns and wants to continue using its data it could restore just the version it wants.

In one embodiment, if step 415 indicates that the data volume meets the criteria to preserve the data volume, and that the data volume is to be tracked, in step 440, the storage controller 230 generates a unique token regarding the data volume and the version that is being deleted. The token may comprise, for example, a new volume ID (identification), a time stamp, a random or algorithmically generated number, or more than one or all of the above. In one example, the unique token comprises 6 bytes of information. In one example, the timestamp is the time of the Delete command. In step 445, the command doing the deletion communicates the token and other information regarding the deletion to the host 225. The host may store the token at the host or in storage associated with the host, for example, in a table of data volume addresses.

The unique token is usable by the host to correctly identify the preserved data of interest. Rather than being tied to a specific data volume, the unique token allows a new version of the data to be maintained or deleted itself while retaining access to regenerate a prior version of the data volume as well. It allows a new address to be used for the regenerated data so that the data is restored to a new, different volume. Thus, the user is not tied to a specific volume and version, and may associate the version of interest to the revised data volume/version in step 400. As will be discussed, regenerating the data to a new, different volume address, the resource usage can be balanced.

The unique token allows the preservation of several versions of a volume, and then the regeneration of a specific version.

In step 450, the data is migrated to the designated preservation storage, such as preservation storage pool 315. As discussed above, the deletion parameters specify where to migrate the data volume prior to deletion, and the physical location of the migration may be to a logical address to the same storage device or to a partition of the device, or to a different storage device of the same or different logical storage controller or same or different CEC. The speed of the migration is dependent upon other uses of the data storage system and the various priorities of those uses. Migration may comprise migrating, moving and/or copying the data volume to an additional location, such as preservation storage pool 315, and additionally comprises storing the metadata associated with the data volume. The metadata may be stored with the data of the preserved volume or stored with other metadata by the storage controller 230 at the storage controller or in an associated storage pool. In one embodiment, the metadata comprises the ID of the data volume in the current storage pool, and the ID of the data volume in the last storage pool before the volume was deleted.

Once the data has been migrated in step 450, the storage controller 230, in step 455, if the host retains control over the deletion, notifies the host 225 that it can delete the data volume. Alternatively, the storage controller 230, if the storage controller controls the data volume that is to be deleted, conducts the deletion. For example, the data volume to be deleted may be located in one of the primary storage pools 235, 245. In response to the command to delete the volume in step 410, the storage controller acknowledges the deletion to the host 225 and, in step 455, deletes that data volume.

Figure 4:
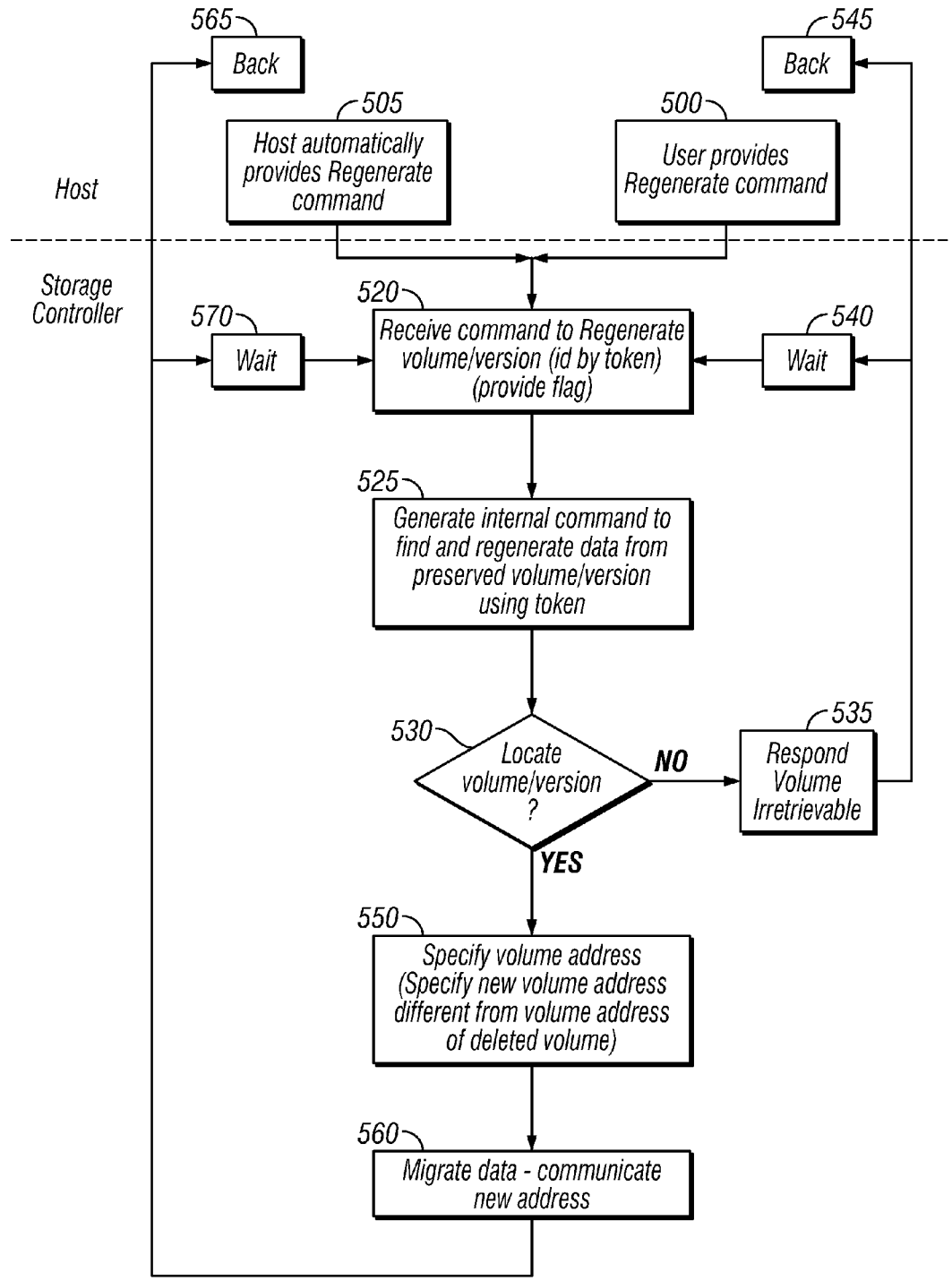
FIG. 4 is a flow diagram showing one embodiment of a method for regenerating the data that had been preserved, creating a new volume address for the data of the preserved deleted volume, the new volume address different from the volume address of the deleted volume in the computer-implemented system of FIG. 2.

Referring to FIGS. 2 and 4, an embodiment of a process for regenerating the data of the preserved deleted data volume is illustrated.

The regeneration may be initiated in one of various ways. In one embodiment, the user, in step 500, enters a CLI or GUI command, for example at a host 225 and/or other computing device in communication with the storage controller 230, the provided command or request to regenerate the data of the preserved deleted data volume. The command or request will additionally comprise an identification of the data to be regenerated. For example, the command or request provides the unique token to identify the data. As another example, the command or request provides the data volume ID and an identification of the version of the data volume.

Alternatively, in step 505, the host 225 automatically provides the command. As an example, when a host accesses a deleted volume, the host receives a status signal indicating that the volume is no longer available. In one embodiment, when the host receives such a status signal, the host invokes a "volume access and data recovery" application. The application sends a new query ("Query Volume Deleted State") that will obtain the state of the device that provided the status signal. The storage controller 230 queries the metadata of the preserved deleted data or queries the pool used to preserve the volume, if any. If the data has been preserved, the storage controller responds to the host with data indicating the existence of the data and metadata. The host then provides the command or request to regenerate the data of the preserved deleted data volume. The command or request is, in one embodiment, a CLI-like command, and includes the unique token to identify the desired preserved data. The command may also provide an instruction to indicate whether to migrate the data to the same or a different storage pool 235, 245 than the storage pool originating the data. Alternatively, the indication whether to use the same or a different storage pool may be previously set up by the host at the storage controller.

The storage controller 230 that interfaces with the host 225, in step 520, receives the CLI-like command to "regenerate" a volume data and metadata from the preserved data, and, in step 525, responds to the received command, generating a command to find the data identified by the unique token, and create a new volume address for the data of the preserved deleted volume. An example of a storage controller internal regenerate command is illustrated in FIG. 5, and comprises the order of the command, and flags to indicate whether the present invention is employed for the regeneration, and whether to migrate the data to another storage pool. For example, if the data is to be regenerated at a new volume address different from the volume address of the deleted volume, flag bit 0 is not set; and if the regenerated data is to replace the existing data, the flag at bit 0 is set so that the volume address at the last storage pool when the volume was deleted, which is contained in the metadata. If the regenerated data is to be migrated to the same storage pool of the volume that was deleted, the flag bit 1 is not set; if the regenerated data is to be migrated to a specified pool, the flag bit 1 is set. Flag bit 2, when set, indicates that the command is the regeneration command of the present invention. The regenerate command, in one embodiment, also comprises the ID of the data volume and its extent pool. This ID comprises the volume address for the data of the preserved deleted volume, and in accordance with one embodiment, this address is the new volume address which is different from the volume address of the deleted volume.

Referring to FIGS. 2 and 4, in step 520, the storage controller 230 invokes a "volume creator" module to find the version of the volume in the storage pool 315 of preserved deleted volumes, employing the unique token, for example, by searching the metadata of the volumes. In one embodiment, the metadata contains the unique token, and the ID of the current storage pool.

In step 530, the storage controller 230 determines whether the unique token has been found and the data volume and version exists. For example, the data preservation retention time may have been exceeded, or the data preservation priority may have indicated that the data was a lower priority than competing data, and the data may have been overwritten and no longer exists. If the data is not located, the storage controller, in step 535, responds to the host 225 that the volume is irretrievable. The storage controller then moves to a wait state 540 to wait for the next command, and the process of responding to the host comprises state 545 at the host 225.

If the storage controller in step 530 finds the preserved deleted data volume, the storage controller 230 invokes a "volume regenerator" module in step 550 to allocate space for the volume in the appropriate storage pool 235, 245. In one embodiment, the allocated space is a new volume address different from the volume address of the deleted volume. If flag bit 1 of the Regenerate command of FIG. 5 is set, that new volume address is also in a different storage pool 235, 245 than that of the deleted volume. A reason for employing a different storage pool may be to balance the storage workload between the storage pools.

By having the new volume address different from the volume address of the deleted volume, the most recent existing subsequent updated version of the data volume is protected against being overwritten by the prior version that has been deleted and preserved.

In step 560, the storage controller migrates the preserved deleted data to the new volume address, and notifies the host 225 of the new address for the data.

The migration process additionally comprises a cleanup process to modify the data volume to be compatible with the new volume. For example, in the IBM® ESS (Enterprise Storage Server) such as a DS8000, and in the case of disk drives or RAID, track synthesis becomes part of the cleanup process. Data may be stored in a CKD (Count Key Data) format, and the storage controller adds an additional header to the count field to indicate the volume related information such as logical subsystem and device addresses. When the data is saved and associated with the unique token on the deletion of the volume, the track data continues to have the headers associated with the volume, and must be redefined when the data is again presented to the host at the new volume address in step 565.

The track synthesis can begin in the background in part or in whole before allowing the volume to be accessed, but needs to be completed before read or write. If volume access is allowed before all the tracks are synthesized, and track access is to a track that has not yet been synthesized, track access is delayed and the track synthesis process is executed for the track. Once the track is synthesized, access is given to the track.

In one embodiment, a bitmap is used to follow the synthesis process, and the corresponding bit is toggled to indicate the work has been done at the track represented by the bit. Dynamic track synthesis allows the storage controller 230 to break the volume affiliation when regenerating the data volumes, and thereby maximizes the possible locations for the preserved version to physically reside depending on the needs of the user or the host applications.

Upon completion of the migration, the storage controller then moves to a wait state 570 to wait for the next command A person of ordinary skill in the art will appreciate that the embodiments of the present invention, disclosed herein, including the computer-implemented system 200 of FIG. 2 for storing data of the system 100 of FIG. 1 and preserving and regenerating deleted data, and the functionality provided therein, may be embodied as a system, method or computer program product. Accordingly, embodiments of the present invention may take the form of an entirely hardware embodiment, an entirely software embodiment (including firmware, resident software, micro-code, etc.) or a combination thereof, such as an embodiment combining software and hardware aspects that may all generally be referred to herein as a "circuit," "module" or "system." Furthermore, embodiments of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those of skill in the art will understand that changes may be made with respect to the methods discussed above, including changes to the ordering of the steps. Further, those of skill in the art will understand that differing specific component arrangements may be employed than those illustrated herein.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a computer-implemented data storage system, said system storing data in the form of volumes, the method comprising:
    responding to a received command to delete a volume of data identified by a volume address, preserving data of said volume prior to deletion, and generating a unique token associated with said volume and version of said volume as of said deletion;
    communicating said unique token as associated with said received delete command; and
    responding to a received command to regenerate said data of said deleted volume, generating a command to find said data identified by said unique token, and creating a new volume address for said data of said preserved deleted volume, said new volume address different from said volume address of said deleted volume.

2. The method of claim 1, wherein said unique token is also stored with metadata associated with said preserved deleted volume, and wherein said command to find said data is implemented in said storage system to search metadata for said unique token.

3. The method of claim 1, additionally comprising the steps of migrating said preserved data to a volume having said new volume address, and communicating said new address as associated with said received regenerate command.

4. The method of claim 3, wherein said storage system comprises at least two storage pools, and said new volume address is in a different said storage pool from said deleted volume address.

5. The method of claim 4, wherein said generated command comprises at least one flag to indicate whether to place said new volume address in said different storage pool.

6. The method of claim 5, wherein said metadata comprises the identification of said storage pool of said deleted volume address.

7. The method of claim 1, wherein said generated command is generated by a storage controller of said computer-implemented data storage system.

8. A computer program product to regenerate deleted data stored in the form of volumes in a computer-implemented data storage system, comprising computer-usable storage medium having non-transient computer-usable program code embodied therein, said computer-usable program code comprising:

computer-usable program code to respond to a received command to delete a volume of data identified by a volume address, preserving data of said volume prior to deletion, and generating a unique token associated with said volume and version of said volume as of said deletion;

computer-usable program code to communicate said unique token as associated with said received delete command; and computer-usable program code to respond to a received command to regenerate said data of said deleted volume, generating a command to find said data identified by said unique token, and creating a new volume address for said data of said preserved deleted volume, said new volume address different from said volume address of said deleted volume.

9. The computer program product of claim 8, comprising computer-usable program code to store said unique token with metadata associated with said preserved deleted volume, and wherein said command to find said data is implemented in said storage system to search metadata for said unique token.

10. The computer program product of claim 8, additionally comprising computer-usable program code to migrate said preserved data to a volume having said new volume address, and to communicate said new address as associated with said received regenerate command.

11. The computer program product of claim 10, wherein said storage system comprises at least two storage pools, and said new volume address is in a different said storage pool from said deleted volume address.

12. The computer program product of claim 11, wherein said generated command comprises at least one flag to indicate whether to place said new volume address in said different storage pool.

13. The computer program product of claim 12, wherein said metadata comprises the identification of said storage pool of said deleted volume address.

14. A computer-implemented data storage system, comprising:

data storage apparatus storing data in the form of volumes;

at least one computer system comprising:

at least one computer-usable storage medium having non-transient computer-usable program code embodied therein; and at least one computer processor implementing said computer-usable program code to operate said data storage apparatus to:

respond to a received command to delete a volume of data identified by a volume address, preserving data of said volume prior to deletion, and generating a unique token associated with said volume and version of said volume as of said deletion;

communicate said unique token as associated with said received delete command; and respond to a received command to regenerate said data of said deleted volume, generating a command to find said data identified by said unique token, and creating a new volume address for said data of said preserved deleted volume, said new volume address different from said volume address of said deleted volume.

15. The computer-implemented system of claim 14, wherein said at least one computer processor implements said computer-usable program code to operate said data storage apparatus to store said unique token with metadata associated with said preserved deleted volume, and wherein said command to find said data is implemented to search metadata for said unique token.

16. The computer-implemented system of claim 14, wherein said at least one computer processor implements said computer-usable program code to operate said data storage apparatus to additionally migrate said preserved data to a volume having said new volume address, and communicate said new address as associated with said received regenerate command.

17. The computer-implemented system of claim 16, wherein said data storage apparatus comprises at least two storage pools, and wherein said new volume address is in a different said storage pool from said deleted volume address.

18. The computer-implemented system of claim 17, wherein said generated command comprises at least one flag to indicate whether to place said new volume address in said different storage pool.

19. The computer-implemented system of claim 18, wherein said metadata comprises the identification of said storage pool of said deleted volume address.

20. The computer-implemented system of claim 14, wherein said at least one computer system comprises a control unit.

* * * * *